(12) United States Patent
Feldhahn

(10) Patent No.: US 7,246,099 B2
(45) Date of Patent: Jul. 17, 2007

(54) METHOD AND SYSTEM FOR UPDATING ELECTRONIC BUSINESS CARDS

(76) Inventor: Jeffrey M. Feldhahn, 3635 Winters Hill Dr., Atlanta, GA (US) 30360

( * ) Notice: Subject to any disclaimer, the term of this patent is extended or adjusted under 35 U.S.C. 154(b) by 0 days.

(21) Appl. No.: 10/889,102

(22) Filed: Jul. 13, 2004

(65) Prior Publication Data

US 2005/0091074 A1    Apr. 28, 2005

Related U.S. Application Data

(60) Provisional application No. 60/513,220, filed on Oct. 23, 2003.

(51) Int. Cl.
    *G06Q 99/00* (2006.01)
(52) U.S. Cl. .......................... 705/65; 705/64; 705/500; 707/200; 707/204
(58) Field of Classification Search ............ 705/64–65, 705/1, 500; 707/200–206
    See application file for complete search history.

(56) References Cited

U.S. PATENT DOCUMENTS

| | | |
|---|---|---|
| 5,483,052 A | 1/1996 | Smith, III et al. |
| 5,493,105 A | 2/1996 | Desai |
| 5,506,954 A | 4/1996 | Arshi et al. |
| 5,544,358 A | 8/1996 | Capps et al. |
| 5,546,447 A | 8/1996 | Skarbo et al. |
| 5,572,582 A | 11/1996 | Riddle |
| 5,590,038 A | 12/1996 | Pitroda |
| 5,604,640 A | 2/1997 | Zipf et al. |
| 5,634,668 A | 6/1997 | Barreiro, Jr. |
| 5,640,565 A | 6/1997 | Dickinson |
| 5,706,517 A | 1/1998 | Dickinson |
| 5,717,863 A | 2/1998 | Adamson et al. |
| 5,732,229 A | 3/1998 | Dickinson |
| 5,752,059 A | 5/1998 | Holleran et al. |
| 5,774,117 A | 6/1998 | Kukkal et al. |
| 5,809,230 A | 9/1998 | Pereira |
| 5,818,442 A | 10/1998 | Adamson |
| 5,836,616 A | 11/1998 | Cooper |

(Continued)

FOREIGN PATENT DOCUMENTS

WO    WO 01/08047    2/2001

OTHER PUBLICATIONS

"vCard: The Electronic Business Card; A Versit Consortium White Paper" by the *Internet Mail Consortium*; c. 1997.

(Continued)

*Primary Examiner*—Kambiz Abdi
(74) *Attorney, Agent, or Firm*—Clark & Brody

(57) ABSTRACT

The present invention provides a method and system that allows individuals to maintain current contact information in another individual's contact software without having to individually notify the receiving individual or manually resend the updated contact information to the individual. The invention does this by utilizing an existing platform for the distribution of static contact information (the v-Card platform), and through the means of storing static contact information for an individual on a central server and then assigning a globally unique ID to the individual and his information. The invention includes in the static contact information created by an individual, a dynamic link containing a creator's globally unique ID that may be utilized by recipients of the contact information to retrieve updated contact information at any future time.

14 Claims, 4 Drawing Sheets

U.S. PATENT DOCUMENTS

| | | | |
|---|---|---|---|
| 5,852,807 A | 12/1998 | Skarbo et al. | |
| 5,854,898 A | 12/1998 | Riddle | |
| 5,859,979 A | 1/1999 | Tung et al. | |
| 5,862,325 A | 1/1999 | Reed et al. | |
| 5,909,687 A | 6/1999 | Tapper | |
| 6,085,242 A * | 7/2000 | Chandra | 709/223 |
| 6,889,213 B1 * | 5/2005 | Douvikas et al. | 705/67 |
| 2001/0027472 A1 * | 10/2001 | Guan | 709/203 |
| 2002/0016857 A1 * | 2/2002 | Harari | 709/238 |
| 2002/0052921 A1 * | 5/2002 | Morkel | 709/206 |
| 2002/0184199 A1 * | 12/2002 | Celik | 707/3 |
| 2002/0188606 A1 * | 12/2002 | Sun et al. | 707/10 |
| 2002/0193102 A1 * | 12/2002 | Hyyppa et al. | 455/419 |
| 2003/0050920 A1 * | 3/2003 | Sun | 707/2 |
| 2003/0171991 A1 * | 9/2003 | Robbins | 705/14 |
| 2004/0093317 A1 * | 5/2004 | Swan | 707/1 |
| 2004/0267625 A1 * | 12/2004 | Feng et al. | 705/26 |
| 2006/0168012 A1 * | 7/2006 | Rose et al. | 709/206 |

OTHER PUBLICATIONS

"vCard and vCalendar" by the *Internet Mail Consortium;* c. 1999.

PDI Transfer Press Release "Versit Assigns Ownership of vCard and vCalendar Technology to the Internet Mail Consortium (IMC) . . . " by the *Internet Mail Consortium;* c. 1999.

"Vcard Overview" by the *Internet Mail Consortium;* c. 1999.

"Vcard Overview; META Group" by the *Internet Mail Consortium;* c. 1999.

"Zoomit . . . supports Vcard text" by the *Microsoft;* c. 2000.

"vCard MIME Directory Profile" by *Lotus Development Corporation & Netscape Communications;* c. 1998.

"A MIME Content-Type for Directory Information" by *Lotus Development Corporation & Netscape Communications;* c. 1998.

"MyEBC.com" website printout; c. 2000.

"eCode.com" website printout; c. 1998.

"ECODE description" by *eCode.com;* c. 1998.

J. Romero, "i-DEX Requirements Document", Version 1, May 1, 2000.

* cited by examiner

METHOD AND SYSTEM FOR UPDATING ELECTRONIC BUSINESS CARDS

This application claims benefit under 35 USC 119(e) based on provisional patent application No. 60/513,220 filed on Oct. 23, 2003.

FIELD OF THE INVENTION

The present invention provides a method and system utilizing electronic cards and a method and system that permits creators of the electronic cards to have their contact information contained within the electronic cards and to be saved by an email recipient of the electronic cards into the recipient's contact software such as Outlook or Lotus Notes, and in particular, permits the recipients of the electronic cards to receive updated contact information of the electronic card creator automatically from within their contact software.

BACKGROUND ART

A globally experienced custom encountered during a business meeting is the exchange of paper business cards. Such custom is engaged in so that each involved party might be able to identify and contact the other party at some future date.

Problems arise with such custom, such as loss of the business cards or changes to the contact information of a party from the information contained on the paper business card. There have been several attempts to try and resolve these problems through the use of the Internet. The prior art has used different systems and methods to transfer contact information principally: (i) v-Cards, (ii) electronic business cards sent through email, and (iii) updating contact software that plugs into a user's contact software and communicates with another user having the same software operating in their contact software.

In 1996, a consortium of software companies established a standard for creating a "virtual" business card (v-Card) to facilitate the idea of transferring contact information electronically between individuals using different email or contact information programs. v-Cards can be used and created with contact software programs such as Microsoft Outlook and IBM's Lotus Notes. The principal failing of the v-Card is that once an individual creates a v-Card that is sent to others via email and then saved in the recipient's contact software, the information contained on the v-Card is static—in other words, it does not automatically update itself in the recipient's contact software if the creator alters his contact information. Thus, the creator of the v-Card would need to resend an email containing his v-Card and the recipient would have to resave the v-Card to replace the outdated contact information. The "static" nature of the information transmitted via v-Cards has been a principle impediment in keeping v-Cards from being widely adopted or improving the means by which individuals stay in touch with one another.

Several companies have developed electronic business card products that get embedded in a user's email and sent out to recipients. Two of these companies are World2one and MyEBC.com. These electronic business card products allow a recipient of an email that contains an electronic business card to save the electronic card in a proprietary software application developed by these companies. The software applications are similar to electronic rolodexes. Once an electronic card is saved into these electronic rolodexes, if the creator later modifies his contact information, he does not have to notify the recipient of the change. The electronic card of the creator contained in the recipient's electronic Rolodex is automatically updated.

World2one's has an electronic business card product that consists of an image of the business card being sent from the World2one central server to a recipient's email, so that any change in information made by the creator of the electronic business card is also visible in a recipient's email immediately following the change made by the creator. Thus, an image sent in an email months prior to the information change is updated so that once the recipient looks back at the old email, assuming it has been kept by the recipient, the recipient will see the new information on the business card since the image is being sent from World2one's server to the recipient's email.

The difficulties with the types of products described above is that a recipient needs to download a proprietary software application in order to store the electronic business cards, or in the case of World2one, save the old email so that the recipient can view any new information.

Another company that has developed electronic business cards that are sent via email is Hotbar.com. This company does not provide a proprietary software application where its electronic business cards can be stored by a recipient, but rather the information contained on the electronic business card can be placed in the v-Card format with the image of the business card being displayed in the creator's email. A recipient can then save the creator's business card information in the same fashion that an individual would save a v-Card, as described above. Since the Hotbar.com product simply utilizes the v-Card format, the problems described above persist. That is, once an individual creates a v-Card that is sent to others via email and then saved in the recipient's contact software, the information contained on the v-Card is static—in other words, it does not automatically update itself in the recipient's contact software if the creator alters his contact information. Thus, the creator of the v-Card would need to resend an email containing his v-Card and the recipient would have to resave the v-Card to replace the outdated contact information. The "static" nature of the information transmitted via v-Cards has been a principle impediment in keeping v-Cards from being widely adopted or improving the means by which individuals stay in touch with one another.

Another approach taken by some companies to solve the problem of updating contact information between parties is to have users download a piece of software that "plugs into" their address books and allows individuals to automatically update their contact information with those users that are utilizing the same software. These companies are Plaxo.com, Good Contacts, and Corex Technologies Accucard product. These products operate in the following fashion. Once an individual downloads these software products onto their computer, the software then reads through the user's contact software and will automatically generate an email to individuals identified in the user's contact software, and request that the individual checks the current contact information contained on that individual that is in the user's contact software—the individual's contact information is displayed in the automatically generated email. If the individual's current contact information is different from what the user has displayed in the email as being contained in the user's contact software, the individual is asked to update his information and send it back to the user. In this scenario, the obligation is on the recipient of the email that was sent by the user of the software to update his information and send it back to the user.

In the alternative, a recipient of an email that was sent by the user of the software could opt to also download the proprietary "plug in" software into their address books and then their contact information will be automatically updated with other users that have the "plug in" software without the sending of update requests via email. The deficiency of this solution is the requirement that a recipient utilize the same "plug in" software as another user in order to keep from receiving annoying requests to update their contact information in the software user's contact software. The requirement that a new software application be downloaded and installed on a user's computer, which software must then be learned, provides a deterrent for many individuals from utilizing this solution.

Accordingly, a need has developed to provide an improved way of keeping the information associated with an electronic business card in an up-to-date fashion. The present invention solves this need by providing an electronic business card that can be updated solely by the actions of the card holder.

SUMMARY OF THE INVENTION

One object of the present invention is a method and system that allows individuals to maintain current contact information in another individual's contact software without having to individually notify the receiving individual or manually resend the updated contact information to the individual.

Aspects of the invention include: (i) a step initiating the process whereby an individual completes a web based registration form containing contact information unique to the creator; (ii) a further step whereby the creator's contact information is saved and stored on a central server, and a globally unique ID is generated for the creator and his contact information; (iii) a further step whereby the creators contact information is compiled into a format of a graphical electronic business card and a v-Card; (iv) a further step whereby the creator's graphical electronic business card and v-Card are sent to the creator from the central server via email so that creator may begin utilizing the graphical electronic business card and v-Card in creator's email correspondence; (iv) a further step permits recipients of the creator's email to save the creator's contact information utilizing the v-Card platform into the recipient's contact software; (v) a further step involves including with the contact information of creator and saved into recipient's contact software, the inclusion of a hyperlink to the central server with such hyperlink containing the globally unique ID of creator thereby permitting access to creator's contact information for retrieval purposes; (iv) a further step whereby creator can update his contact information at any time in the future and save such updated information on the central server, thereby replacing creator's original contact information; and (vii) a further step whereby a recipient may at any future time access creator's contact information in recipient's contact software and then utilize the hyperlink containing creator's globally unique ID to retrieve any updated contact information on creator provided by creator on the central server.

One advantage of the present invention is that a creator is enabled to keep his contact information current with all recipients of creator's original contact information without having to notify individual recipients of changes to creator's contact information. Further, recipients are enabled to retrieve updated contact information on the creator without having to contact the creator prior to retrieving such updated information. Thus, individuals are able to keep accurate contact information on one another without having to make individual requests to one another and without having to obtain any new software to permit the exchange other than the current contact software, for example, such as Outlook or Lotus Notes, that individuals are currently utilizing.

The invention is an improvement in the method of sending an electronic business card of a creator to a recipient for storage in contact software of the recipient. According to the invention, the electronic business card of the creator is stored on a central server in a v-Card format or equivalent format. A global identifier is assigned to the electronic business card that is unique to the creator. When the electronic business card is sent to the recipient, a hyperlink is transmitted to the recipient with the sent electronic business card. The hyperlink is displayed in the contact software of the recipient when viewing information contained in the electronic business card. The hyperlink allows the recipient to update the electronic business card by linking to the creator's stored electronic business card on the central server, merely by clicking on the hyperlink.

The creator can update information contained in the electronic business card on the central server to produce an updated electronic business card that is accessible to all recipients of creator's electronic business card. When a recipient clicks on the hyperlink subsequent to an updating step, the recipient will obtain an updated electronic business card. When the creator updates the information stored on the server, the creator can also send the updated electronic business card to other recipients. The contact software can be Outlook, Lotus Notes or other software that supports the v-Card standard.

The creator can initially create the electronic business card by accessing the central server. Once the card is created, the creator can obtain the created electronic business card via e-mail or accessing a link on the website that is part of the central server.

The invention also entails a system for automatically updating information within contact software, specifically through the creation of contact information files by users with the storage of such information on a central server. The central server stores contact information for a plurality of creators in a v-Card format, each creator having a globally unique identifier, with the globally unique identifier associated with the contact information for each creator. The system includes one or more creator computers, with each adapted to link to the central server to input original and updated contact information for each creator. The creator computers also are adapted to receive the original and updated contact information for dissemination to one or more recipients. Also as part of the system are one or more recipient computers. Each recipient computer is adapted to receive e-mail from one or more creators, the e-mail containing the original or updated contact information sent by a creator. Each recipient computer is adapted to link to the central server using the globally unique identifier contained in the original or updated contact information to further update the original or updated contact information.

BRIEF DESCRIPTION OF THE DRAWINGS

Reference is now made to the drawings of the invention wherein.

DESCRIPTION OF THE PREFERRED EMBODIMENTS

Figure 1:
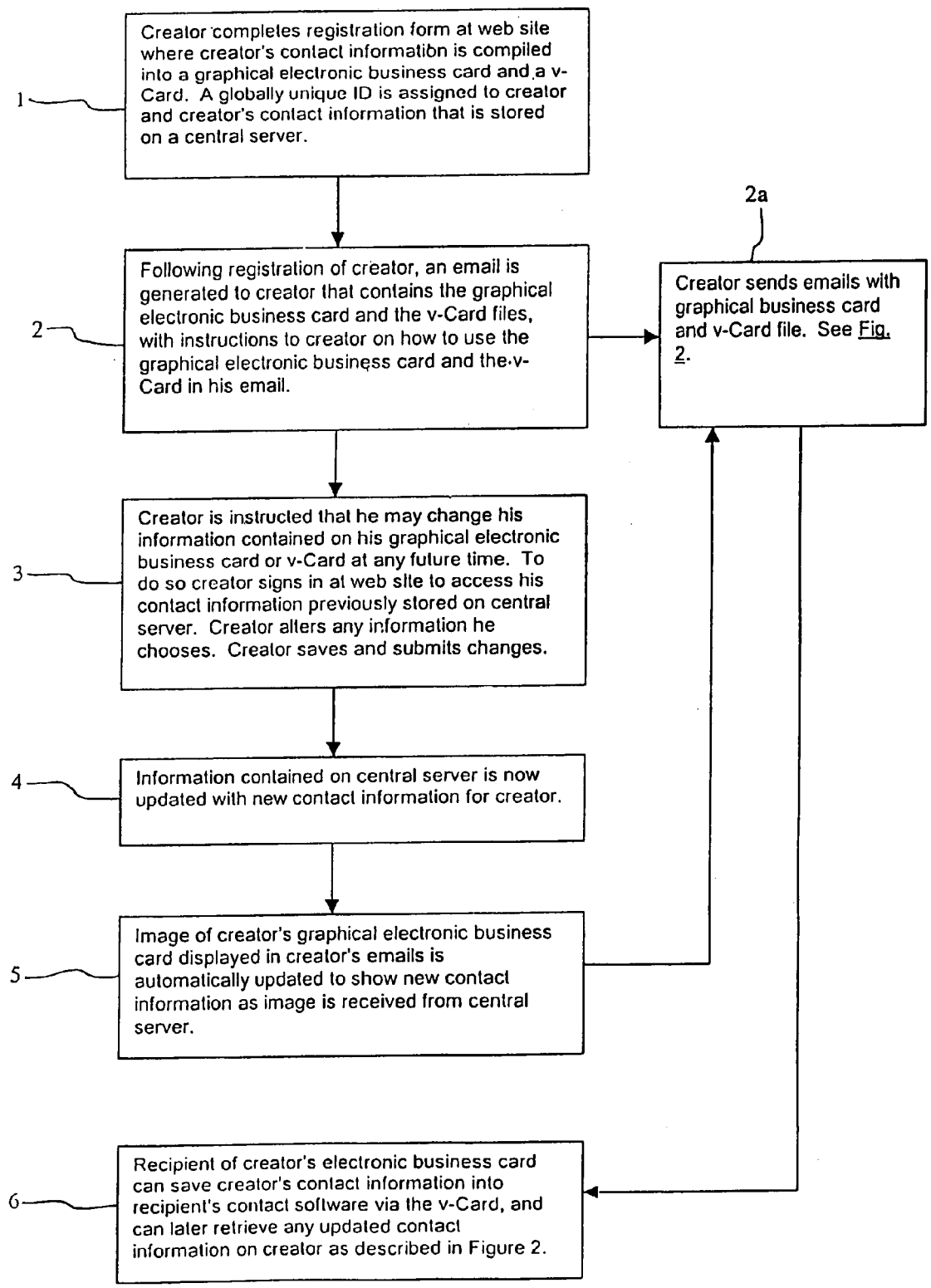
FIG. 1 is a flowchart showing the sequence of events for the invention for a first time user of the invention.

The present invention provides a method and system that allows individuals to maintain current contact information in another individual's contact software without having to individually notify the receiving individual or manually resend the updated contact information to the individual. The invention does this by utilizing an existing platform for the distribution of static contact information (the v-Card platform). Through means of storing static contact information for an individual on a central server and then assigning a globally unique ID to the individual and his/her information, the invention includes in the static contact information created by an individual, a dynamic link containing a creator's globally unique ID that may be utilized by recipients of the contact information to retrieve updated contact information at any future time.

More particularly, the method for automatically updating information within contact software involves the creation of contact information files by users (creators) with the storage of such information on a central server. Then a globally unique ID is assigned to each creator, which can then be transmitted by the creator to other individuals via email. Recipients of the creator's email can save creator's information into their contact software (including the creator's globally unique ID). Advantageously, each recipient can then at a future time retrieve any updated information on creator by connecting to the central server through a hyperlink containing creator's globally unique ID that is included in the creator's e-mail that send the business card information. Accessing this hyperlink links to the creator's updated information, wherein the information that recipient has on the creator is updated with the any new contact information provided by the creator.

To accomplish one aim of the invention, the standard v-card interface is used as a starting point. A hyperlink is embedded into the comments part or field of the v-Card. The hyperlink links to the website/central server referencing the electronic business card with the globally unique identifier (GUID). This embedding step to associate the GUID with the electronic business card is routine and well within the skill of the artisan. A unique aspect of the invention is the fact that the website references the electronic business card in v-Card format and GUID. The electronic business card is saved in the v-Card format with the GUID hyperlink inserted into the comments of the v-Card. This configuration allows the contact information to be updateable by displaying the hyperlink in the contact software of recipient, FIG. 1 details the procedure, which involves the creation of the card itself. Step 1 relates to the creation step involving the creator and the web site that it the repository for the card information. That is, once the creator has registered with the entity controlling the central server, the electronic business card is created. Along with the card, a globally unique identifier is assigned to the creator's information, i.e., the card. Once the electronic card is created, the card can be e-mailed to the creator as detailed in step 2. From step 2, the creator can send the card to anyone of interest, see step 2a, and the activity following receipt of this e-mail is detailed in FIG. 2 and discussed below.

Step 3 of FIG. 1 addresses the change of information as done by the creator. This is done by the creator accessing the website, which in turn then allows the creator to access the creator's contact information. The appropriate changes can be made at the website, i.e., on the central server, and saved. Step 4 shows the completion of the updating step of information on the server. Step 5 describes the receipt of the updated card by the creator via e-mail so that the creator can see how the new information looks.

Once the information is put on the central server, either as original information or updated information, the creator can then e-mail the information, see step 2a, and recipients can then access the updated information as detailed in Step 6.

Figure 2:
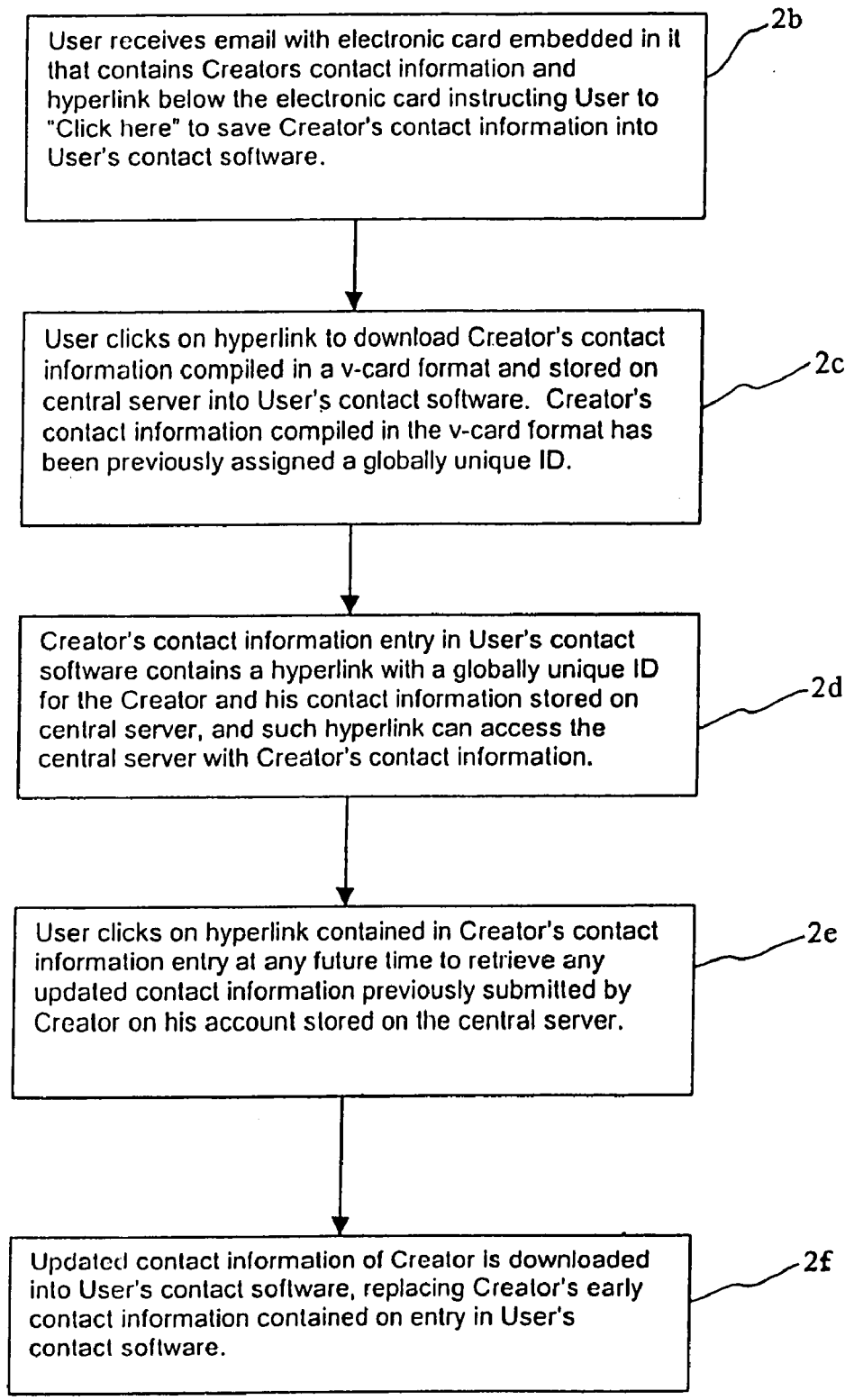
FIG. 2 is a flowchart showing the sequence of events for an individual being introduced to the invention by a user of the invention.

Accessing the updated information is addressed in FIG. 2, wherein Step 2b describes the activity when the recipient receives the e-mail with the electronic business card from the creator. Once the e-mail is received by the recipient, the recipient will be instructed to save the information in the e-mail to the creator's contact software.

Step 2c describes the downloading process wherein the recipient saves the creator's information in the recipient's contact software by hitting a "click here" command found in the e-mail. That is, clicking on the hyperlink in the e-mail downloads the creator's contact information in a v-Card format and saves it on the contact software of recipient's computer.

Step 2d describes the display of the update hyperlink in the comments section or field of the contact information for the creator. That is, the contact information loaded into the recipient's contact software includes a hyperlink that allows the recipient to connect to the central server by clicking on the hyperlink and access the e-mail sender's contact information, including any updated information that may have been added since receipt of the original contact information.

Clicking on the hyperlink is described in Step 2e. By this action, the recipient is linked to the central server. The global identifier in the hyperlink enables the recipient to link to the creator's information in the central server. Step 2f details what happens once the central server is accessed. If the creator has updated the contact information since the card was sent to recipient, the updated information is downloaded to the recipient's contact software, and the information of the creator is current. If the creator has not updated the information on the central server, the information in the recipient's contact software would not change.

Figure 3:
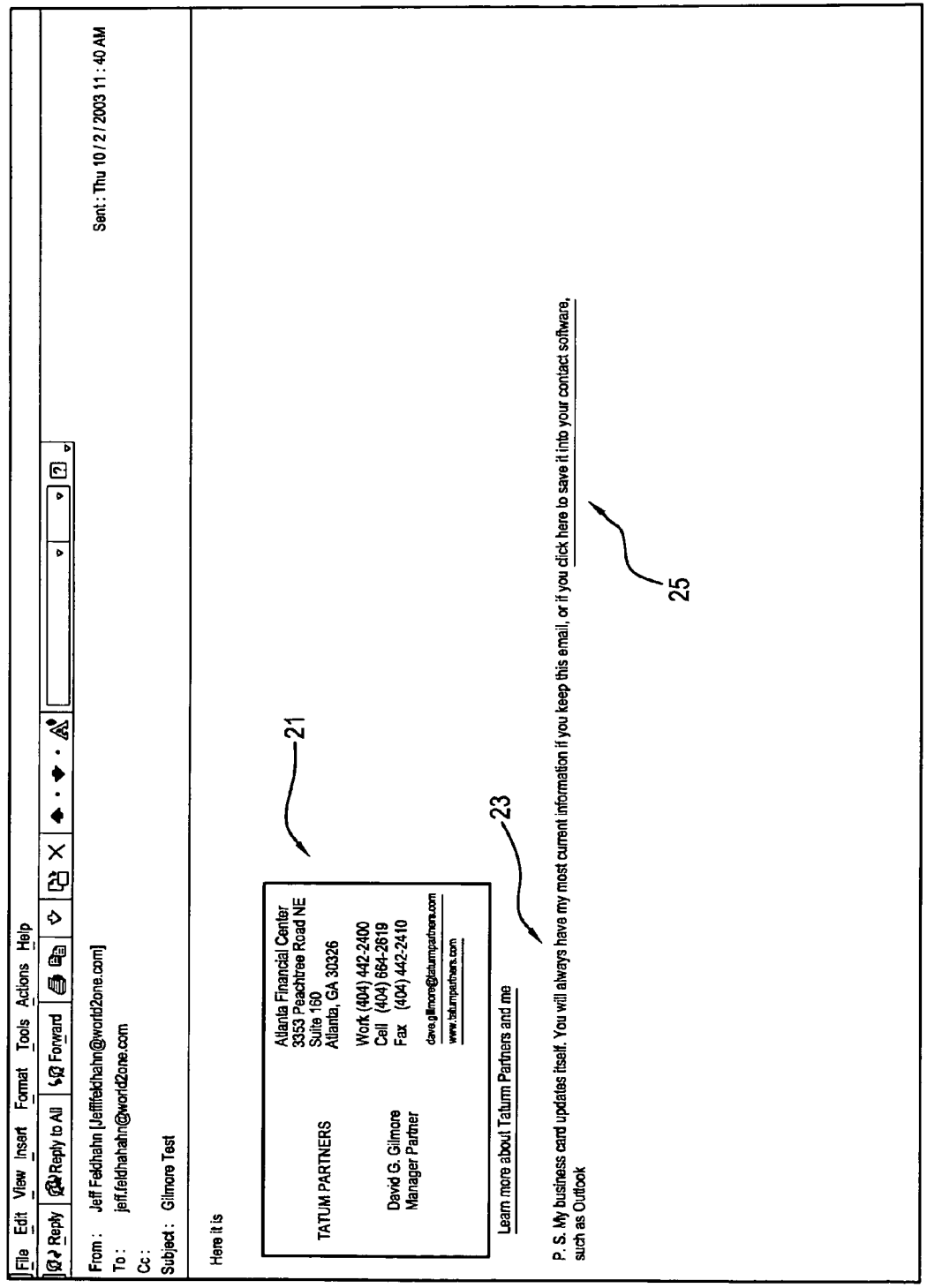
FIG. 3 shows a screen shot depicting how the electronic business card would look when received by a recipient via e-mail.

FIG. 3 shows an e-mail 20 as sent by a creator to a recipient. The e-mail includes the electronic business card 21 with information regarding the creator. The e-mail has postscript sentence 23 that tells the recipient that the information on the card can be saved by merely clicking on the link 25 wherein the sentence says "click here to save it into your contact software". Clicking on this link corresponds to processing described in step 2c of FIG. 2.

Figure 4:
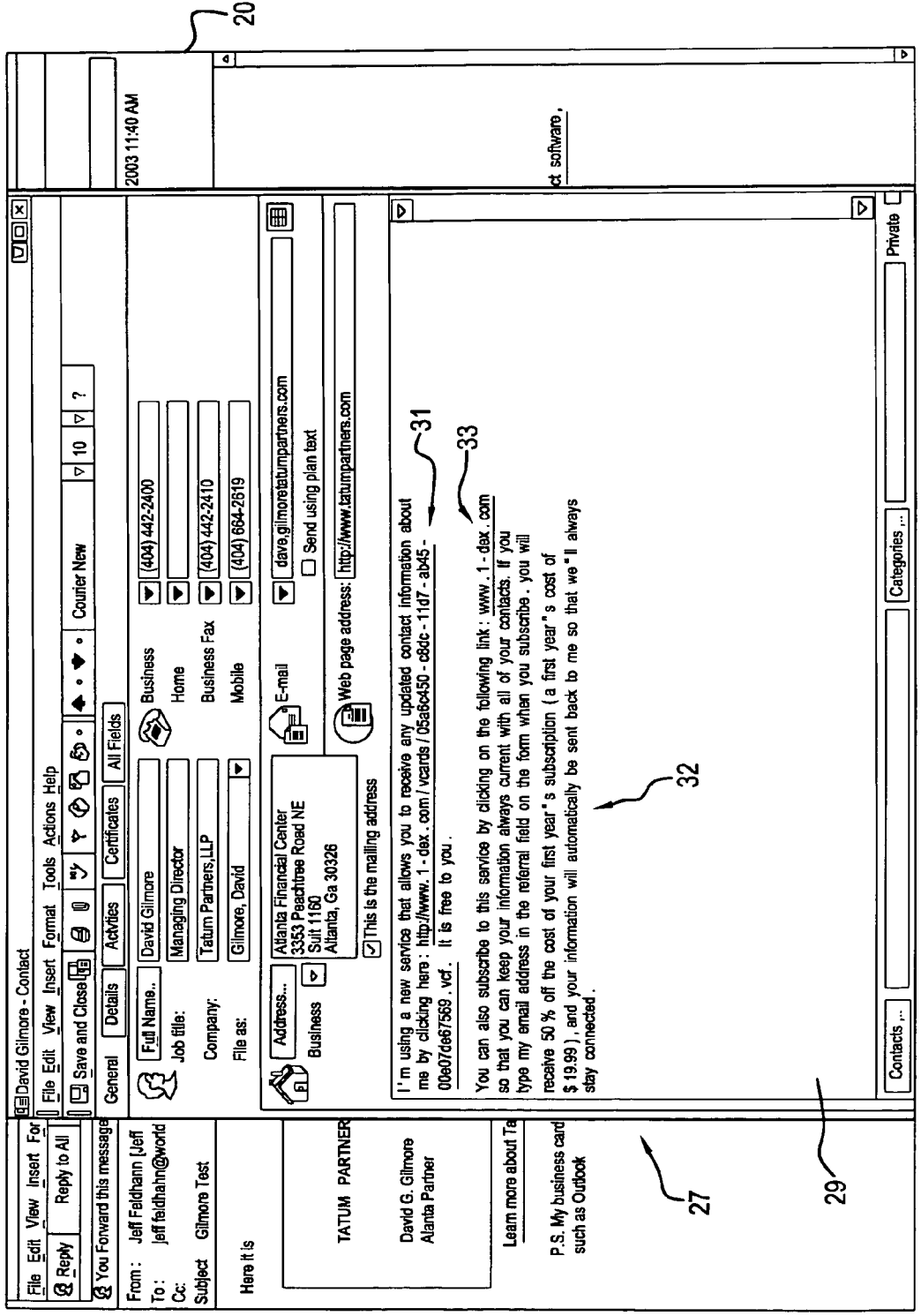
FIG. 4 shows a screen shot of the contact information associated with the card of FIG. 3, including the hyperlink that allows the recipient to update the card information by merely clicking on the link.

FIG. 4 shows the result of clicking on the link 25 in the e-mail 20 of FIG. 3. The recipient's contact software receives the information from the creator, and the information populates the various fields of the contact software. The creator's information is displayed in the box 27. Box 27 also includes two other displays of information in the field 29. First, another link 31 is provided with an explanation to the recipient that the recipient can retrieve updated information about the person sending the e-mail, the creator, by clicking on the link. The link 31 includes the global identifier, which directs the recipient to the proper contact file at the central server, see step 2*d* of FIG. 2. As explained above in FIG. 2, step 2*e*, clicking on the link 31 results in the recipient accessing the central server, which will return, updated information for the box 27 if available.

The field 29 also has a sentence 32 inviting the recipient to subscribe to the electronic business card service by clicking on yet another link 33. By clicking on this link, the recipient can create his/her own electronic business card as described in FIG. 1, and then e-mail it to others and allow them the opportunity for keeping the information current. Providing the opportunity in the form of the invite sentence 33 offers the website owner to generate substantial amounts of revenue via subscriptions.

While Outlook and Lotus are exemplified as contact software, it is believed that the invention can be practiced with virtually any contact software that supports the v-Card standard.

While the preferred mode of sending the created or updated card to the creator is e-mail, other modes could be used. For example, once the electronic business card is created or updated on the central server, the card could be stored on media such as a floppy disk, zip drive, CD, website or the like and sent to the creator in this type of media for updating in the creator's computer. Likewise, if need be, the electronic card could be given to a recipient for loading on the recipient's computer using the media described above or via a link within the central server owner's website.

While the v-Card format is exemplified as the preferred format when creating the electronic business card, other formats as would be known in the art could also be used. An Example would include XML (eXtensible Markup Language). This would need to become a new standard that other contact management software would need to adopt.

As such, an invention has been disclosed in terms of preferred embodiments thereof which fulfills each and every one of the objects of the present invention as set forth above and provides a new and improved system and method for sending electronic business cards via e-mail, and allowing the information to be updated at the leisure of the recipient of the e-mail.

Of course, various changes, modifications and alterations from the teachings of the present invention may be contemplated by those skilled in the art without departing from the intended spirit and scope thereof. It is intended that the present invention only be limited by the terms of the appended claims.

I claim:

1. In a method of sending an electronic business card of a creator to a recipient for storage in contact software of the recipient, the improvement comprising:
   a) storing the electronic business card of the creator on a central server and assigning a global identifier to the electronic business card that is unique to the creator, and
   b) sending a hyperlink to the recipient with the sent electronic business card, the hyperlink being downloaded to the contact software of the recipient for display when viewing information contained in the electronic business card, the hyperlink allowing the recipient to update the electronic business card by linking to the creator's stored electronic business card on the central server, wherein the downloading step further comprises clicking on another hyperlink to automatically download the information into the contact software, the downloaded information including the hyperlink displayed in the contact software.

2. The method of claim 1, further comprising the step of the creator updating information contained in the electronic business card on the central server to produce an updated electronic business card that is accessible to all recipients of creator's electronic business card.

3. The method of claim 2, wherein, after the updating step, the recipient accesses the central server using the hyperlink to obtain the updated electronic business card.

4. The method of claim 2, wherein the creator sends the updated electronic business card to other recipients.

5. The method of claim 1, wherein the recipient after receiving the transmitted electronic business card, updates information in the electronic business card by accessing the creator's stored electronic business card on the central server using the hyperlink.

6. The method of claim 1, wherein the electronic business card is created by the creator via access to the central server, and the created electronic business card is either e-mailed to the creator, accessed using a link within an owner of the central server's website, or sent to the creator on storage media.

7. The method of claim 1, wherein the electronic business card uses a v-Card format.

8. A system for automatically updating information within contact software, specifically through the creation of contact information files by users with the storage of such information on a central server comprising:
   a central server storing contact information for a plurality of creators, each creator having a globally unique identifier, with the globally unique identifier associated with the contact information for each creator;
   the central server linked to one or more creator computers, each creator computer linked to the central server to input original and updated contact information for each creator and receive the original and updated contact information for dissemination to one or more recipients;
   the central server linked to one or more recipient computers, each of the recipient computers receiving e-mail from one or more creators containing the original or updated contact information sent by a creator, each recipient computer linking to the central server using the globally unique identifier contained in the original or updated contact information to further update the original or updated contact information, each of the one or more recipient computers having contact software;
   wherein the e-mail received from the one or more creators includes a hyperlink which is downloaded into the contact software for display when viewing the original or updated contact information contained in the e-mail to allow the recipient to further update the original or updated contact information from the central server via the hyperlink, wherein the hyperlink displayed in the contact software is downloaded by clicking on another hyperlink included in the e-mail.

9. The method of claim 1, further comprising the step of charging each creator a subscription fee for at least the storing of the electronic business card on the central server.

10. The method of claim 9, wherein an invitation to pay the subscription fee is displayed with the contact information of the creator.

11. The method of claim 1, wherein the electronic business card and hyperlink are sent to the recipient on storage media or by e-mail.

12. The method of claim 1, further comprising the step of displaying a link with the sent electronic business card in an e-mail, the link designed so that clicking on the link directly saves the hyperlink and information contained in the sent electronic business card in the contact software.

13. The method of claim 1, wherein the electronic business card uses an electronic business card standard and the contact software is compatible with the electronic business card standard.

14. The system of claim 8, wherein the electronic business card uses an electronic business card standard and the contact software is compatible with the electronic business card standard.

* * * * *